2,694,089

PROCESS FOR THE RECOVERY OF dl-THREO-1-p-NITROPHENYL-2-AMINO-1,3-PROPANEDIOL

Angelo John Speziale, Kirkwood, and David B. Guthrie, Glendale, Mo., assignors to Monsanto Chemical Company, St. Louis, Mo., a corporation of Delaware No Drawing. Application August 12, 1950,
Serial No. 179,084

7 Claims. (Cl. 260—570.6)

This invention relates to dl-threo-1-p-nitrophenyl-2-amino-1,3-propanediol; more specifically, this invention relates to an improvement in the process for the recovery of dl-threo-1-p-nitrophenyl-2-amino-1,3-propanediol from aqueous solutions of its mineral acid salts.

dl-Threo-1-p-nitrophenyl-2-amino-1,3-propanediol is one of the many intermediates obtained in the currently described multiple step complex process for the preparation of D-threo-N-(1,1'-dihydroxy-1-p-nitrophenylisopropyl)-dichloroacetamide (chloramphenicol). dl-Threo-1-p-nitrophenyl-2-amino-1,3-propanediol is prepared by the hydrochloric acid hydrolysis of dl-threo-1-p-nitrophenyl-2-acetamido-1,3-propanediol thereby forming an aqueous solution of acetic acid and the dl-threo-1-p-nitrophenyl-2-amino-1,3-propanediol hydrochloride. The aqueous solution of the amine hydrochloride is then made alkaline by the addition of a strong base thereby precipitating the free amine. The resultant aqueous slurry of dl-threo-1-p-nitrophenyl-2-amino-1,3-propanediol is cooled to 20° C., the amine filtered therefrom, recovered and dried. Utilizing commercial grade materials, this process consistently results in a 70–80% yield of the amine.

It is an object of this invention to provide an improvement in the process for the recovery of dl-threo-1-p-nitrophenyl-2-amino-1,3-propanediol from an aqueous solution of its water soluble acid salt obtained by the mineral acid hydrolysis of dl-threo-1-p-nitrophenyl-2-acetamido-1,3-propanediol in an aqueous medium. Further objects will become apparent from a description of the novel process of this invention.

It has now been discovered that if the aqueous slurry of dl-threo-1-p-nitrophenyl-2-amino-1,3-propanediol, obtained by the neutralization of an aqueous solution of its water soluble acid salt prepared by the mineral acid hydrolysis of dl-threo-1-p-nitrophenyl-2-acetamido-1,3-propanediol in an aqueous medium, is cooled to a temperature below about 5° C., instead of 20° C. as heretofore used, the yield of dl-threo-1-p-nitrophenyl-2-amino-1,3-propanediol may be significantly increased. According to a preferred embodiment of this invention, therefore, dl-threo-1-p-nitrophenyl-2-acetamido-1,3-propanediol is hydrolyzed with an aqueous solution of a mineral acid, thereby forming an aqueous solution of the acid salt of dl-threo-1-p-nitrophenyl-2-amino-1,3-propanediol. The aqueous solution of the acid salt of dl-threo-1-p-nitrophenyl-2-amino-1,3-propanediol is then made alkaline by the addition of ammonium hydroxide or an alkali metal hydroxide, thereby precipitating the free dl-threo-1-p-nitrophenyl-2-amino-1,3-propanediol. The aqueous slurry of the dl-threo-1-p-nitrophenyl-2-amino-1,3-propanediol is then cooled to 5° C. or lower and the dl-threo-1-p-nitrophenyl-2-amino-1,3-propanediol filtered therefrom and dried.

The following examples are illustrative of the novel improved process of this invention:

Example I 50.8 g. of dl-threo-1-p-nitrophenyl-2-acetamido-1,3-propanediol are heated for one hour at 94–97° C. in a solution containing 250 ml. of water and 58.3 g. of 18° Bé. hydrochloric acid, thereby forming an aqueous solution of dl-threo-1-p-nitrophenyl-2-amino-1,3-propanediol hydrochloride. The solution is made alkaline to a pH of 9–9.5 by the addition of 100 ml. of concentrated ammonium hydroxide, thereby precipitating the free dl-threo-1-p-nitrophenyl-2-amino-1,3-propanediol. The aqueous slurry of dl-threo-1-p-nitrophenyl-2-amino-1,3-propanediol thus obtained is cooled to 5° C. and filtered. The dl-threo-1-p-nitrophenyl-2-amino-1,3-propanediol thus obtained is then dried by heating at a temperature of 60° C. 36.3 g. of substantially pure dl-threo-1-p-nitrophenyl-2-amino-1,3-propanediol are obtained representing an 85.6% yield based on the dl-threo-1-p-nitrophenyl-2-acetamido-1,3-propanediol utilized, considering it as 100% pure. The dl-threo-1-p-nitrophenyl-2-amino-1,3-propanediol thus obtained is a white crystalline solid having a melting point of 139–141° C.

Example II

The procedure set forth in Example I is repeated utilizing in place of the 100 ml. of concentrated ammonium hydroxide 33 g. of sodium hydroxide. The quality and yield of dl-threo-1-p-nitrophenyl-2-amino-1,3-propanediol thus obtained are similar to that obtained in Example I.

Example III

The procedure set forth in Example I is repeated utilizing in place of the 100 ml. of concentrated ammonium hydroxide 43 g. of potassium hydroxide. The quality and yield of dl-threo-1-p-nitrophenyl-2-amino-1,3-propanediol thus obtained are similar to that obtained in Example I.

Example IV

The procedure set forth in Example I is repeated utilizing in place of the 58.3 g. of 18° Bé. hydrochloric acid, 30 g. of 66° Bé. sulfuric acid, and utilizing in place of the 100 ml. of ammonium hydroxide, 37 g. of sodium hydroxide. The quality and yield of dl-threo-1-p-nitrophenyl-2-amino-1,3-propanediol thus obtained are similar to that obtained in Example I.

The unexpected and significant improvement obtained in the novel improved process of this invention as compared to the process as heretofore used is made clearly evident by the following example:

Example V 50.8 g. of dl-threo-1-p-nitrophenyl-2-acetamido-1,3-propanediol are heated for one hour at 94–97° C. in a solution containing 250 ml. of water and 58.3 g. of 18° Bé. hydrochloric acid, thereby forming an aqueous solution of dl-threo-1-p-nitrophenyl-2-amino-1,3-propanediol hydrochloride. The solution is made alkaline to a pH of 9–9.5 by the addition of 100 ml. of concentrated ammonium hydroxide, thereby precipitating the free dl-threo-1-p-nitrophenyl-2-amino-1,3-propanediol. The aqueous slurry of dl-threo-1-p-nitrophenyl-2-amino-1,3-propanediol thus obtained is cooled to 20° C. and filtered. The dl-threo-1-p-nitrophenyl-2-amino-1,3-propanediol thus obtained is then dried by heating at a temperature of 60° C. 33.7 g. of substantially pure dl-threo-1-p-nitrophenyl-2-amino-1,3-propanediol are obtained representing a 79.4% yield based on the dl-threo-1-p-nitrophenyl-2-acetamido-1,3-propanediol utilized, considering it as 100% pure. The dl-threo-1-p-nitrophenyl-2-amino-1,3-propanediol thus obtained is a white crystalline solid having a melting point of 139–141° C. and identical in quality to the dl-threo-1-p-nitrophenyl-2-amino-1,3-propanediol obtained in Example I.

The filtrate obtained from the filtration at 20° C. of the aqueous slurry of dl-threo-1-p-nitrophenyl-2-amino-1,3-propanediol as described above was then cooled to 5° C. and seeded. No further precipitate of the dl-threo-1-p-nitrophenyl-2-amino-1,3-propanediol could be made to form. In view of the fact that no further quantity of the dl-threo-1-p-nitrophenyl-2-amino-1,3-propanediol can be made to precipitate when the filtrate obtained by filtering the aqueous slurry of the dl-threo-1-p-nitrophenyl-2-amino-1,3-propanediol at 20° C. is cooled to 5° C., the increased yield obtained by initially cooling the aqueous slurry of the dl-threo-1-p-nitrophenyl-2-amino-1,3-propanediol to 5° C. and filtering is clearly unexpected.

In carrying out the novel improved process of this invention, any of the mineral acids may be utilized in effecting the hydrolysis of the dl-threo-1-p-nitrophenyl-2-acetamido-1,3-propanediol. Typical of such acids are hydrochloric acid, sulfuric acid and phosphoric acid. The temperature at which the hydrolysis is carried out may be varied over a wide range, such as in the range of from about 30° C. to about 100° C. Preferably, the temperature is maintained near the boiling point of the reaction mixture.

The aqueous solution of the mineral acid salt of dl-threo-1-p-nitrophenyl-2-amino-1,3-propanediol may be made alkaline by the addition thereto of ammonium hydroxide or any of the alkali metal hydroxides, such as sodium hydroxide, potassium hydroxide or lithium hydroxide. It is preferred that a sufficient quantity of the alkaline agent be added so that the aqueous slurry of the dl-threo-1-p-nitrophenyl-2-amino-1,3-propanediol have a pH greater than about 8.0, preferably in the range of from about 8.0 to about 14.0.

In order to obtain the increased yield of the dl-threo-1-p-nitrophenyl-2-amino-1,3-propanediol according to the novel improved process of this invention, the aqueous slurry must be filtered at a temperature below about 5° C. The lower limit of the temperature range at which this aqueous slurry can be filtered and obtain the increased yields of the dl-threo-1-p-nitrophenyl-2-amino-1,3-propanediol is governed solely by the crystallizing point of the aqueous slurry. Thus, according to the novel improved process of this invention, the aqueous slurry of dl-threo-1-p-nitrophenyl-2-amino-1,3-propanediol is filtered at a temperature in the range of below about 5° C. and above the crystallizing point of the aqueous slurry.

What is claimed is:

1. In the process for the recovery of dl-threo-1-p-nitrophenyl-2-amino-1,3-propanediol obtained through the hydrolysis of dl-threo-1-p-nitrophenyl-2-acetamido-1,3-propanediol with a mineral acid in an aqueous medium and the subsequent neutralization of the resulting solution of the mineral acid salt with a strong base, the improvement comprising adding said strong base to said aqueous acidic medium until it has a pH greater than 8.0 thereby precipitating the desired free amine, cooling the resulting alkaline slurry to a temperature of from about 5° C. to about the crystallizing point of the slurry and recovering the free amine by filtering said slurry at a temperature below about 5° C.

2. In the process for the recovery of dl-threo-1-p-nitrophenyl-2-amino-1,3-propanediol obtained through the hydrolysis of dl-threo-1-p-nitrophenyl-2-acetamido-1,3-propanediol with a mineral acid in an aqueous medium and the subsequent neutralization of the resulting solution of the mineral acid salt with a strong base, the improvement comprising adding to the acidic aqueous medium immediately following hydrolysis a strong base selected from the group consisting of ammonium hydroxide and the alkali metal hydroxides until the resulting aqueous medium has a pH greater than 8.0 thereby precipitating the desired free amine, cooling the resulting alkaline slurry to a temperature of from about 5° C. to about the crystallizing point of the slurry and recovering the free amine by filtering said slurry at a temperature below about 5° C.

3. In the process for the recovery of dl-threo-1-p-nitrophenyl-2-amino-1,3-propanediol obtained through the hydrolysis of dl-threo-1-p-nitrophenyl-2-acetamido-1,3-propanediol with sulfuric acid in an aqueous medium and the subsequent neutralization of the resulting sulfuric acid salt with a strong base, the improvement comprising adding to the aqueous solution of said sulfuric acid salt immediately following hydrolysis a strong base selected from the group consisting of ammonium hydroxide and the alkali metal hydroxides until the resulting aqueous mixture has a pH greater than 8.0 thereby precipitating the desired free amine, cooling the resulting alkaline slurry to a temperature of from about 5° C. to about the crystallizing point of the slurry and recovering the free amine by filtering said slurry at a temperature below about 5° C.

4. In the process for the recovery of dl-threo-1-p-nitrophenyl-2-amino-1,3-propanediol obtained through the hydrolysis of dl-threo-1-p-nitrophenyl-2-acetamido-1,3-propanediol with hydrochloric acid in an aqueous medium and the subsequent neutralization of the resulting solution containing the amine hydrochloride with a strong base, the improvement comprising adding to said aqueous solution of amine hydrochloride immediately following hydrolysis a strong base selected from the group consisting of ammonium hydroxide and the alkali metal hydroxides until the resulting aqueous mixture has a pH greater than 8.0 thereby precipitating the desired free amine, cooling the resulting alkaline slurry to a temperature of from about 5° C. to about the crystallization point of the slurry and recovering the free amine by filtering said slurry at a temperature below about 5° C.

5. In the process for the recovery of dl-threo-1-p-nitrophenyl-2-amino-1,3-propanediol obtained through the hydrolysis of dl-threo-1-p-nitrophenyl-2-acetamido-1,3-propanediol with hydrochloric acid in an aqueous medium and the subsequent neutralization of the resulting solution containing the amine hydrochloride with a strong base, the improvement comprising adding ammonium hydroxide to said aqueous solution of amine hydrochloride immediately following hydrolysis until the resulting aqueous mixture has a pH greater than 8.0 thereby precipitating the desired free amine, cooling the resulting alkaline slurry to a temperature of from about 5° C. to about the crystallizing point of the slurry and recovering the free amine by filtering said slurry at a temperature below about 5° C.

6. In the process for the recovery of dl-threo-1-p-nitrophenyl-2-amino-1,3-propanediol obtained through the hydrolysis of dl-threo-1-p-nitrophenyl-2-acetamido-1,3-propanediol with hydrochloric acid in an aqueous medium and the subsequent neutralization of the resulting solution containing the amine hydrochloride with a strong base, the improvement comprising adding sodium hydroxide to said aqueous solution of amine hydrochloride immediately following hydrolysis until the resulting aqueous mixture has a pH greater than 8.0 thereby precipitating the desired free amine, cooling the resulting alkaline slurry to a temperature of from about 5° C. to about the crystallizing point of the slurry and recovering the free amine by filtering said slurry at a temperature below about 5° C.

7. In the process for the recovery of dl-threo-1-p-nitrophenyl-2-amino-1,3-propanediol obtained through the hydrolysis of dl-threo-1-p-nitrophenyl-2-acetamido-1,3-propanediol with hydrochloric acid in an aqueous medium and the subsequent neutralization of the resulting solution containing the amine hydrochloride with a strong base, the improvement comprising adding potassium hydroxide to said aqueous solution of amine hydrochloride immediately following hydrolysis until the resulting aqueous mixture has a pH greater than 8.0 thereby precipitating the desired free amine, cooling the resulting alkaline slurry to a temperature of from about 5° C. to about the crystallizing point of the slurry and recovering the free amine by filtering said slurry at a temperature below about 5° C.

References Cited in the file of this patent

UNITED STATES PATENTS

| Number | Name | Date |
|---|---|---|
| 2,513,346 | Moresch et al. | July 4, 1950 |

OTHER REFERENCES

Badger et al.: "Elements of Chemical Engineering" (1936), page 440.

Rebstock et al.: J. A. C. S., vol. 71, pp. 2458–2462 (July 1949).

Controulis et al.: J. A. C. S., vol. 71, pp. 2463–2468 (July 1949).

Long et al.: J. A. C. S., vol. 71, pp. 2473–2475 (July 1949).